United States Patent [19]
Danylewich

[11] 3,869,200
[45] Mar. 4, 1975

[54] EYEGLASS FRAMES
[75] Inventor: David S. Danylewich, Burlington, Canada
[73] Assignee: Lawrence Peska Associates, Inc., New York, N.Y.
[22] Filed: Nov. 23, 1973
[21] Appl. No.: 418,413

[52] U.S. Cl. .................................. 351/85, 351/178
[58] Field of Search... G02c/1/80, 351/86, 91, 147, 351/149, 178, 51, 85

[56] References Cited
UNITED STATES PATENTS
2,482,144  9/1949  Allen ................................ 351/85

FOREIGN PATENTS OR APPLICATIONS
676,869  5/1952  Great Britain .................... 351/85
608,735  9/1948  Great Britain .................... 351/85

Primary Examiner—Alfred E. Smith
Assistant Examiner—Wm. H. Punter
Attorney, Agent, or Firm—Henry I. Steckler

[57] ABSTRACT

An eyeglass frame can removably receive a pair of lenses. To secure the lenses, a pair of bars slide within a pair of slots over the lenses. The slots can be grooved, while the bars can have tongues.

5 Claims, 3 Drawing Figures

PATENTED MAR 4 1975　　3,869,200

EYEGLASS FRAMES

The present invention relates to eyeglass frames, and more particularly, to ones that can removably receive a pair of lenses.

When a person has a pair of glasses which have a frame that color matches their clothing outfit, the effect is very pleasing. To do this with a large number of outfits is, however, an obviously expensive proposition. This is because the frames and lenses are expensive and must be bought together.

It is therefore an object of my invention to provide a means for matching an eyeglass frame to a clothing outfit.

It is another object to provide an eyeglass frame with easily removable lenses.

In brief, these and other objects are achieved by having a frame with vertical slots to receive the lenses and horizontal slots to receive a bar that can be inserted over the lenses to keep them in place.

These and other objects, features, and advantages will become apparent from the description when taken in conjunction with the following drawings in which.

Figure 1:
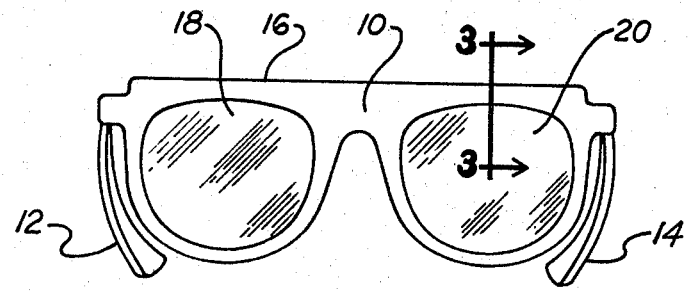
FIG. 1 is a front view of a pair of eyeglasses in accordance with the invention.

FIG. 1 shows an eyeglass frame 10 having a pair of earpieces 12 and 14 and a substantially flat top surface 16. A pair of lenses 18 and 20 are secured within frame 10 in a manner in accordance with the invention to be described below.

Figure 2:
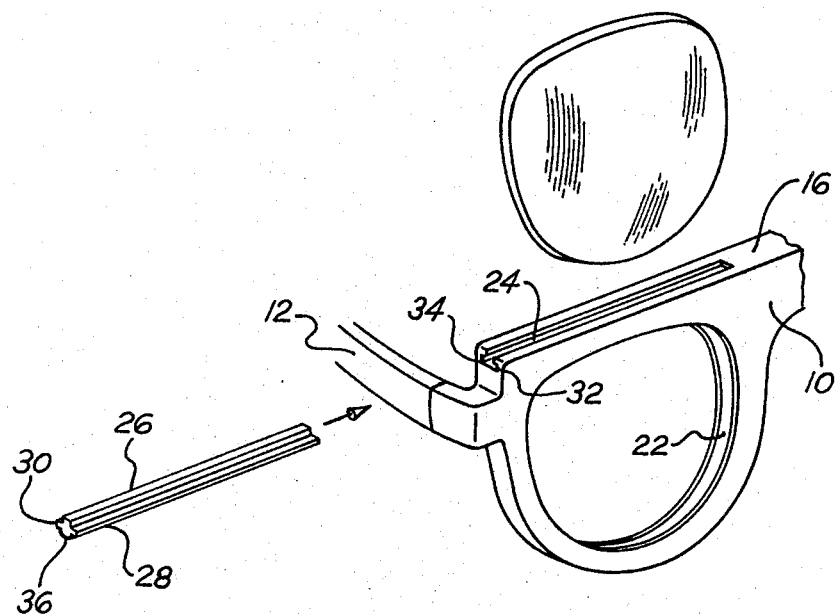
FIG. 2 is an exploded perspective view showing the insertion of a lense and a retaining bar.

In FIG. 2 there is shown that frame 10 has a vertical slot 22 which extends through top 16 for removably receiving the lense 18. Frame 10 also has a horizontal slot 24 extending across top 16. After the lense 18 has been placed fully into slot 22, a retaining bar 26 is inserted into slot 24, thereby securing lense 18 into frame 10.

Figure 3:
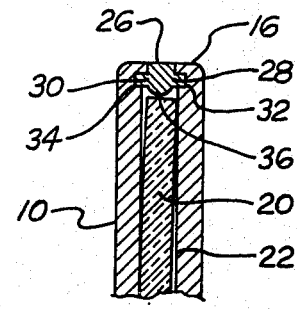
FIG. 3 is a cross-sectional view taken along the line 3 — 3 of FIG. 1.

FIG. 3 shows in detail the securing method for lense 20, which is identical to that for lense 18. Since lense 20, like lense 18, is slightly curved, it frictionally grips the sides of slot 22, thus partially being retained. It will be also seen that bar 26 comprises a pair of lateral tongues 28 and 30 that are received into grooves 32 and 34 respectively of slot 24. Bar 26 also has an arcuate bottom section 36 that engages the top of lense 20, and because of the tongue and groove features, it can press down on lense 20 for a snug, tight, fit of lense 20 into frame 10.

It can be seen that a person can buy many differently colored frames at a reasonably low cost, and use a single pair of lenses with them to achieve color coordination with their clothing. Changing the frames is a quick and easy operation than any one can do.

It will be appreciated that many other embodiments are possible without departing from the spirit and scope of the invention.

Having herein described the invention, what is claimed as new is:

1. An eyeglass frame for a pair of lenses comprising a main frame having a pair of slots vertically extending to receive a pair of lenses respectively and a pair of horizontal slots of selected length extending across said vertical slots respectively, a pair of retaining bars frictionally and slidably disposed in said horizontal slots respectively and extending across said entire lengths respectively for directly engaging and for retaining said lenses, and a pair of earpieces mounted on said frame.

2. A frame as claimed in claim 1 wherein said main frame comprises a flat top surface and said bars comprise straight bars.

3. A frame as claimed in claim 1 wherein each of said bars comprise at least two tongues, and each of said main frame horizontal slots are grooved to receive said tongues.

4. A frame as claimed in claim 1 wherein each of said bars comprises an arcuate section for engaging a surface of said lenses respectively.

5. A frame as claimed in claim 1 wherein each of said bars is flush with the top surface of said main frame.

* * * * *